(12) United States Patent
Taylor-Tibbott (10) Patent No.: US 9,964,114 B2
(45) Date of Patent: May 8, 2018

(54) FLOW OUTLET (71) Applicant: ROLLS-ROYCE PLC, London (GB)

(72) Inventor: Oliver C Taylor-Tibbott, Lichfield (GB)

(73) Assignee: ROLLS-ROYCE plc, London (GB)

( * ) Notice: Subject to any disclaimer, the term of this patent is extended or adjusted under 35 U.S.C. 154(b) by 501 days.

(21) Appl. No.: 14/563,516

(22) Filed: Dec. 8, 2014

(65) Prior Publication Data
US 2015/0176590 A1 Jun. 25, 2015

(30) Foreign Application Priority Data

Dec. 23, 2013 (GB) .................................. 1322832.5

(51) Int. Cl.
| F02C 6/08 | (2006.01) |
| F04D 27/02 | (2006.01) |
| F02C 9/52 | (2006.01) |
| F02C 7/045 | (2006.01) |
| F02K 3/075 | (2006.01) |
| F02C 7/24 | (2006.01) |
| F02C 9/18 | (2006.01) |

(52) U.S. Cl.
CPC ............ *F04D 27/0215* (2013.01); *F02C 6/08* (2013.01); *F02C 7/045* (2013.01); *F02C 7/24* (2013.01); *F02C 9/18* (2013.01); *F02C 9/52* (2013.01); *F02K 3/075* (2013.01); *F05B 2260/962* (2013.01); *F05B 2260/964* (2013.01); *F05B 2260/966* (2013.01); *F05D 2210/33* (2013.01); *F05D 2250/512* (2013.01); *F05D 2260/96* (2013.01); *Y02T 50/671* (2013.01); *Y10T 29/49323* (2015.01)

(58) Field of Classification Search
None
See application file for complete search history.

(56) References Cited

U.S. PATENT DOCUMENTS

| 4,189,027 A | 2/1980 | Dean, III et al. |
| 4,371,054 A * | 2/1983 | Wirt ........................ F01D 25/30 |
| | | 181/252 |
| 6,880,579 B2 * | 4/2005 | Boger ..................... F16K 47/08 |
| | | 138/44 |

(Continued)

FOREIGN PATENT DOCUMENTS

JP     A-2012-159259     8/2012

OTHER PUBLICATIONS

May 28, 2015 Partial European Search Report issued in European Application No. 14 19 6865.

(Continued)

*Primary Examiner* — Carlos A Rivera
*Assistant Examiner* — Kyle Thomas
(74) *Attorney, Agent, or Firm* — Oliff PLC (57) ABSTRACT

A noise attenuation panel for a bleed flow is presented that causes a total pressure loss of the bleed flow before it is exhausted. The total pressure loss results from at least two regions in which the flow area contracts and then rapidly expands, with the rapid expansion causing mixing and turbulence rather than full total pressure recovery. This reduced pressure means that when the flow is exhausted into a flow (which may be the bypass flow of a gas turbine engine), its energy, and thus its noise, are reduced.

13 Claims, 6 Drawing Sheets (56) References Cited

U.S. PATENT DOCUMENTS

| | | | |
|---|---|---|---|
| 2005/0067218 A1* | 3/2005 | Bristow | F01D 17/105 181/237 |
| 2007/0086885 A1 | 4/2007 | Appleby et al. | |
| 2008/0053105 A1* | 3/2008 | Appleby | F02C 6/08 60/785 |
| 2010/0115963 A1* | 5/2010 | Kirby | F01D 17/105 60/785 |
| 2010/0115964 A1* | 5/2010 | Kirby | F01D 17/105 60/785 |
| 2012/0006615 A1* | 1/2012 | Klasing | F02K 3/075 181/224 |
| 2013/0224000 A1 | 8/2013 | Porte et al. | |

OTHER PUBLICATIONS

Oct. 19, 2015 Extended Search Report issued in European Patent Application No. 14196865.1.
Search Report issued in British Patent Application No. 1322832.5 dated Aug. 13, 2014.

* cited by examiner

＃ FLOW OUTLET

CROSS-REFERENCE TO RELATED APPLICATIONS

This application is based upon and claims the benefit of priority from British Patent Application Number 1322832.5 filed 23 Dec. 2013, the entire contents of which are incorporated by reference.

BACKGROUND

1. Field of the Disclosure

This disclosure relates to a flow discharge device and a noise attenuation device for a flow discharge device. The disclosure may be concerned with discharging bleed air in gas turbine engine, for example for bleeding air from a compressor to a bypass duct.

2. Description of the Related Art

Figure 1:
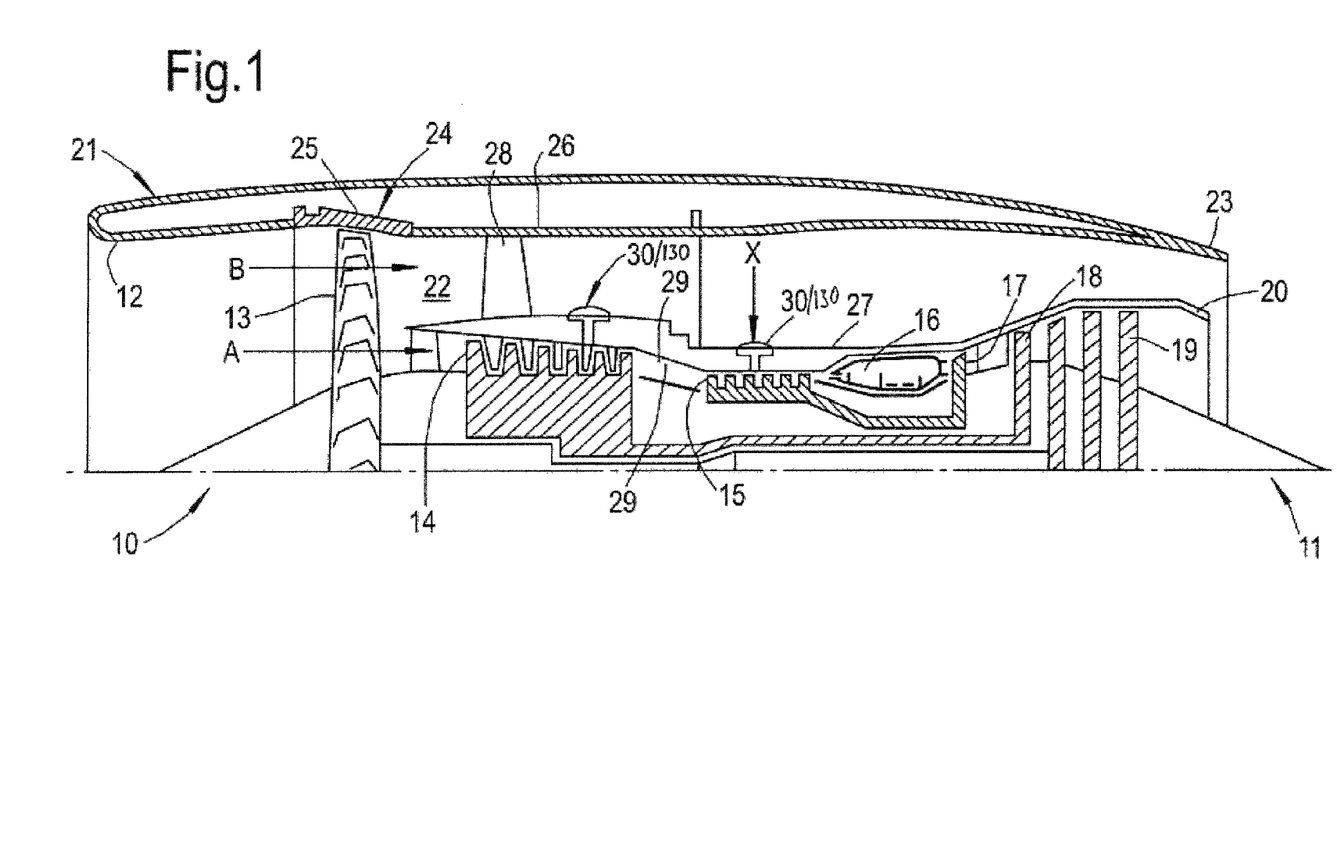
FIG. 1 is a schematic sectional view of a gas turbine engine.

Referring to FIG. 1, a ducted fan (or turbofan) gas turbine engine (e.g. a jet engine) generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and a core exhaust nozzle 20. A nacelle 21 generally surrounds the engine 10 and defines the intake 12, a bypass duct 22 defined by an inner wall 27 and an outer wall 26, and an exhaust nozzle 23.

The gas turbine engine 10 works in the conventional manner so that air entering the intake 12 is accelerated by the fan 13 to produce two air flows: a first airflow A into the intermediate pressure compressor 14 of the engine core and a second airflow B which passes through the bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive, the high, intermediate and low pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

During engine operation and particularly when changing rotational speed at low power it is important to ensure that the pressure ratio across each compressor 14, 15 remains below a critical working point, otherwise the engine 10 can surge and flow through the engine 10 breaks down. This can cause damage to the engine's components as well as aircraft handling problems.

To maintain a preferred pressure difference across a compressor 14, 15, or even just one stage of a compressor 14, 15, bleed assemblies 30 are provided to release pressure from an upstream part of a compressor 14,15. For example, when a gas turbine engine is operating under transient conditions, e.g. when decelerating, it may be necessary to bleed air at high pressure from the core gas flow A through the engine. Operation of a bleed assembly 30 and engine operability are described in "The Jet Engine" 6th Edition, 2005, Rolls-Royce plc, pages 79-80, and details of such operation will therefore only be briefly mentioned herein.

The flow of bleed air from the core gas flow into the bypass flow takes place over a substantial pressure drop, and can generate significant noise. It is therefore usual to provide a noise reduction device in, or at the exit of, the bleed assembly 30 between the core gas flow and the bypass duct, for example in a flow duct of the bleed assembly 30. A typical measure is to pass the bleed flow through a perforated plate, which is commonly referred to as a pepper pot. The pepper pot serves to break the single body of air flowing towards the bypass duct into a large number of smaller jets which promote small-scale turbulence and hence quicker mixing with the main flow through the bypass duct. The turbulent mixing means that there is no full recovery of dynamic head, resulting in a reduction in total pressure of the flow. In turn, this allows the velocity of the bleed flow exiting into the bypass duct to be reduced, thereby reducing noise.

In order to avoid a single large pressure drop and sudden expansion from the high pressure core flow to the bypass flow, two or more pepper pots can be used in series, in order to break the single large pressure drop into a series of smaller pressure drops.

Pepper pots are typically made from thin metallic sheets in which holes are formed, for example by laser cutting, and tend to be expensive. If a series of pepper pots are used downstream of a single bleed valve, the cost is multiplied.

Also, pepper pots are subjected to high transient pressure drops, and the shock loadings can cause them to deform or disintegrate.

OBJECTS AND SUMMARY

It is therefore desirable to be able to reduce the noise generated by a bleed flow in a more efficient and/or compact and/or lower weight manner. Additionally or alternatively, a device that reduces the noise of a bleed flow and can be manufactured in a cost-effective, reliable, high volume and/or robust manner is desirable.

According to an aspect, there is provided a noise attenuation panel for a gas turbine engine comprising a plurality of flow passages. At least one (for example each) flow passage comprises an inlet and an outlet. The flow area through the passage increases downstream of the inlet and may decrease into the outlet.

The inlet and/or the outlet of each flow passage may be referred to as a throat. The flow may experience rapid expansion, and thus turbulent mixing, just downstream of the throat(s). For example, rapid expansion may occur downstream of the inlet where the flow area of the passage increases. Rapid expansion may occur downstream of the outlet outside the noise attenuation panel. The inlet may be referred to as an inlet contraction. The outlet may be referred to as an outlet (or exit) contraction. The throat(s) may be dimensioned such that, in use, the flow through them remains subsonic. Purely by way of example, the Mach number of the flow through the throat(s) (i.e. through the inlets or outlet, or any other throats that may be provided in the noise attenuation panel) may be less than 0.9, for example less than 0.8, for example less than 0.7, for example less than 0.6, for example less than 0.5, for example less than 0.4, for example less than 0.3, for example less than 0.2, for example less than 0.1, for example less than 0.05.

Such a noise attenuation panel may provide at least two total pressure drops, for example one just downstream of the flow inlet and one just downstream of the flow outlet for each passage, in a single, compact, low weight unit. Such a panel may be straightforward to manufacture in a reliable, high volume, cost-effective and robust manner. The noise attenuation panel may alternatively be referred to as a noise reduction panel, a noise attenuation cassette or a noise reduction cassette.

The flow area of each flow passage may increase by at least 10% downstream (for example immediately downstream) of the flow inlet, for example at least 25%, for example at least 50%, for example it may at least double, at least treble, or at least quadruple. By way of example, the flow area may increase (for example by the proportions outlined above) downstream of the inlet within a distance of 0.2 mm, 0.5 mm, 1 mm, 2 mm, 3 mm, 4 mm, 5 mm or 10 mm from the flow inlet.

The flow area of the outlet may be bigger than the flow area of the outlet. This may help to reduce the velocity at the at the flow outlet than would otherwise be the case.

Each flow passage may change direction at least once between the flow inlet and the flow outlet. Such direction change may, for example, assist with the turbulent mixing.

Each flow passage may be in the same direction at the inlet and the outlet. In use, the flow through the inlet may be in the same direction as the flow through the outlet. This may be achieved, for example, by arranging each flow passage such that it has at least two distinct changes of direction. Each bleed flow passage may have at least one change of direction to the right and at least one change of direction to the left. The total angular direction change to the left may be the same as the total angular direction change to the right.

Each flow passage may comprise three distinct changes of direction between the inlet and the outlet, for example.

The noise attenuation panel may be generally perpendicular to a longitudinal axis. Each flow outlet (for example the centre of each flow outlet) may be offset from the flow inlet (for example from the centre of each flow inlet) in a direction perpendicular to the longitudinal axis. The flow inlet and/or the flow outlet of each flow passage may be aligned with the longitudinal axis.

Arranging flow passages so as to have one or more direction changes and/or such that the flow outlet is offset from the flow inlet may reduce the likelihood of items inadvertently being dropped through a bleed assembly, for example during maintenance. Such items could enter the core of the engine, and require significant further maintenance to ensure that they are not left in the engine where they could lead to significant further damage.

The noise attenuation panel may be generally perpendicular to a longitudinal axis and comprise a stiffening rib that extends perpendicularly to the longitudinal axis and along a centreline of the noise attenuation panel. The noise attenuation panel may be symmetrical about a plane passing through the centre of the stiffening rib and containing the longitudinal axis.

A stiffening rib may help to reduce the maximum stress in the centre of the panel at the inner (inlet) and outer (outlet) surfaces. This may allow the cassette to be thinner, should that be aerodynamically desirable and/or possible. This may result in still further reductions in weight and/or cost.

The flow inlets may form a first planar surface. The flow outlets may form a second planar surface, which may be offset from the first planar surface. The second planar surface may be offset from the first planar surface along a longitudinal axis of the noise attenuation panel. The first planar surface and/or the second planar surface may be parallel to each other. The first planar surface and/or the second planar surface may be perpendicular to the longitudinal axis of the noise attenuation panel. The overall geometry and/or dimensions of the noise attenuation panel may be defined at least in part by the first and second planar surfaces that are offset from each other.

Such planar surfaces may assist with the manufacture of noise attenuation panels. For example, it may assist in manufacturing one noise attenuation panel directly on top of another noise attenuation panel more easily, for example using additive layer manufacture.

Between the respective flow inlet and flow outlet of each of the flow passages, there may be a flow contraction portion followed by a flow expansion portion. There may be more than one such flow contraction portion followed by a flow expansion portion. The flow contraction and flow expansion may be between the end of the region in which the passage increases in flow area downstream of the inlet and the start of the region at which the flow area decreases into the outlet. Such a flow contraction portion followed by a flow expansion portion may form a throat. In use, the flow may be subsonic through the throat. The flow expansion portion may be a rapid increase in area (for example similar to the flow expansion downstream of the inlet) such that, in use, the flow separates in the expansion portion, leading to turbulent mixing.

The noise attenuation panel may be for use with a bleed flow discharge device. As such, the noise attenuation panel may be referred to as a bleed flow noise attenuation panel. The flow passing through the noise attenuation panel may be bleed flow. Such bleed flow may be taken from a compressor, or a region between the compressor and a combustor of the core of a gas turbine engine, for example.

According to an aspect, there is provided a bleed flow discharge device for discharging bleed flow taken from a core flow through a core of a gas turbine engine. The bleed flow discharge device comprises a bleed flow duct through which, in use, the bleed flow taken from the core flow passes. The bleed flow discharge device comprises a noise attenuation panel as described and/or claimed herein. The noise attenuation panel is located within the bleed flow duct, such that the bleed flow passes through the noise attenuation panel before exiting from the bleed flow discharge device.

The noise attenuation panel may be provided anywhere along the bleed flow duct, including, for example, at the exit to the bleed flow duct. In arrangements in which the noise attenuation panel is provided upstream of the exit to the bleed flow duct, the bleed flow duct may have a simple open hole at its outlet, or may be provided with a bleed flow outlet panel.

Accordingly, a bleed flow outlet panel may be provided at the outlet to the bleed flow discharge device through which, in use, the bleed flow exits the bleed flow discharge device. Such an outlet panel may be provided downstream of the noise attenuation panel relative to the bleed flow.

In arrangements including a bleed flow outlet panel, the bleed flow outlet panel and the noise attenuation panel may be separate units. Alternatively, the bleed flow outlet panel and the noise attenuation panel may be a single unit. In such an arrangement, the bleed flow outlet panel and the noise attenuation panel may be formed as a single continuous part, with one panel merging directly into the other panel. Thus, the bleed flow outlet panel and the noise attenuation panel may be integrally formed. The flow passage outlets of the noise attenuation panel may form (or be) inlets to corresponding exit passages of the bleed flow outlet panel. Accordingly, the a bleed flow outlet panel may comprise exit passages, and the number of exit passages may be the same as the number of flow passages in the noise attenuation device.

Accordingly, there is provided a bleed flow outlet unit arranged to attenuate noise and direct flow. The flow may be bleed flow that may be bled from a core flow through a core of a gas turbine engine, the bleed flow outlet unit being a unitary part comprising: a noise attenuation portion comprising a noise attenuation panel as described and/or claimed herein; and a bleed flow outlet portion. The bleed flow outlet portion may comprise bleed flow outlet passages. Each flow passage of the noise attenuation portion may be fluidly connected to a single respective bleed flow outlet passage, such that each flow passage of the noise attenuation portion forms a continuous flow passage with its respective bleed flow outlet passage.

In general, a further consideration when discharging bleed flow from a bleed assembly may be that the bleed flow is typically at a significantly higher temperature than the flow into which it is being discharged. This can, in some cases, cause thermal damage if the higher temperature bleed flow impinges on surfaces that are not designed to tolerate such elevated temperatures. Providing a bleed flow outlet panel to the bleed flow discharge device may, in some cases, allow the bleed flow to be directed and/or more effectively mixed with the flow into which it is discharged. This may help to alleviate any problems associated with thermal damage caused by the higher temperature bleed flow. Any such bleed flow outlet panel should have low blockage so as to minimize the size and/or weight of the bleed assembly that is required for a given bleed flow rate.

Where a bleed flow discharge device includes a bleed flow outlet panel (which may be integrated with the noise attenuation panel, as explained above), the bleed flow outlet panel may take any suitable form. For example, as mentioned above, the bleed flow outlet panel may comprise passages, which may be referred to as exit passages because they are the passages through which the bleed flow exits the bleed flow discharge device.

Various optional features relating to a bleed flow outlet panel are now presented. It will be appreciated that such optional features may be relevant where an arrangement includes a bleed flow outlet panel. However, as will be appreciated from the disclosure herein, various arrangements in accordance with the invention may not include such a bleed flow outlet panel and/or a bleed flow outlet panel may itself only be optional to some arrangements of the invention. Any of the optional features presented herein in relation to a bleed flow outlet panel may be included in a bleed flow outlet panel that is integral with a noise attenuation panel, or separate from a noise attenuation panel, for example in a bleed flow discharge device.

By way of example, a bleed flow outlet panel may comprise a perimeter edge that fits within the outlet of the bleed flow discharge device and is formed around a major axis of the bleed flow outlet panel, and a plurality of exit passages. The exit passages may be formed in at least two distinct regions of the bleed flow outlet panel, each region comprising a plurality of adjacent exit passages. The exit passages in a first region may be arranged to direct the bleed flow, in use, in a direction that is substantially aligned with the major axis of the bleed flow outlet panel. The exit passages in a second region may be arranged to direct the bleed flow, in use, in a direction that, when projected onto a plane perpendicular to the major axis and containing the perimeter edge, points towards the closest point on the perimeter edge.

The planform shape of a bleed flow outlet panel may be defined as the shape of the bleed flow outlet panel when viewed along its major axis. The perimeter edge may define a generally planar structure. As such, the bleed flow outlet panel may be a generally planar structure. In such examples, the exit passages in a second region may be arranged to direct the bleed flow, in use, in a direction that, when projected onto the generally planar structure points towards the closest point (which may be referred to as the local closest point) on the perimeter edge.

By way of further example, the bleed flow outlet panel may comprise a perimeter edge formed around a major axis of the bleed flow outlet panel and defining its planform shape. The bleed flow outlet panel may comprise a plurality of exit passages, the exit passages being formed in at least two distinct regions of the bleed flow outlet panel, each region comprising a plurality of adjacent exit passages. The exit passages in a first region may be arranged to direct the bleed flow, in use, in a direction that has a greater component in the direction of the major axis than do the exit passages in the second region.

The major axis of such a bleed flow outlet may be aligned with longitudinal axis of noise attenuation panel. Where reference is made to exit passages of a bleed flow outlet panel being arranged to direct bleed flow in a certain direction, this may mean that those exit passages may be said to point in that direction.

As mentioned herein, a bleed flow discharge device may be arranged for use with a turbofan gas turbine engine having a bypass duct arranged around the engine core, with the bypass duct having a bypass flow passing therethrough in use. In arrangements including a bleed flow outlet panel, the exit passages of the bleed flow outlet panel may be arranged to discharge the bleed flow into the bypass duct and the second region of the bleed flow outlet panel may be generally downstream of the first region relative to the direction of the bypass flow in use. In general, the second region of the bleed flow outlet panel (where present) may be generally downstream of the first region relative to the direction of the flow into which the bleed flow is discharged.

A bleed flow outlet panel may thus have exit passages formed in at least two distinct regions of the bleed flow outlet panel, each region comprising a plurality of adjacent exit passages.

The exit passages in the second region of a bleed flow outlet panel may be said to point in a direction that has a component that points away from the major axis. The exit passages in the second region may be said to point in a direction that has a component that points towards the closest point on the perimeter edge. The absolute angle of the exit passages (for example relative to each other) may vary in the second region, for example depending on the angular position around the major axis and/or the direction from a given exit to the closest position on the perimeter edge of the bleed flow outlet.

The first region may be defined by a first angular segment of a bleed flow outlet panel. The second region may be defined by a second angular segment of the bleed flow outlet panel. In this regard, an angular segment may be a segment or region of the outlet panel between two walls diverging from a central region of the outlet panel to the perimeter edge.

All of the exit passages of a bleed flow outlet panel may be formed in either the first region or the second region.

The exit passages in the second region may be arranged to direct the bleed flow, in use, in a direction that has a major component in the direction of the major axis of the bleed flow outlet panel. All exit passages (for example exit passages in both the first region and the second region) may be said to have a major component that points in the direction of the major axis. In this regard, a major component may mean, for example, that at least 50%, for example at least 60%, for example at least 70%, for example at least 80%, for example at least 90%, of the flow rate through an exit passage is in the direction of the major axis.

A bleed flow outlet panel may comprise two walls that are spaced apart from each other and separate the first region from the second region. Each wall may extend across the thickness of the bleed flow outlet panel, i.e. across the dimension that extends in the direction of the major axis. The wall may extend from the perimeter edge to an inner region or innermost extent of the bleed flow outlet panel.

The perimeter edge, and thus the plan form shape of a bleed flow outlet panel, may take any desired shape. For example, the perimeter edge of the bleed flow outlet panel may comprise a first curved portion and a second curved portion. The first curved portion and/or the second curved portion may be, for example, segments of a circle, for example semi-circular.

The perimeter edge of a bleed flow outlet panel (and/or of a noise attenuation panel according to the invention) may be an elongate shape. Such an elongate shape may have first and second curved portions joined together by a first side edge and a second side edge. The first and second side edges may be straight, or may themselves comprise a curve, or a curved portion. Purely by way of example, the perimeter edge may be a racetrack shape, an oval shape, or a rectangle with curves (such as semi-circles) at either end, or any other desired shape.

The first region may be defined at least in part by at least a part of the first curved portion (for example a part or all of the first curved portion). The first region may be defined at least in part by first and second dividing walls extending into the bleed flow outlet panel from first and second points on the first curved portion, including from first and second ends of the first curved portion.

Where the bleed flow outlet panel comprises first and second dividing walls, they may extend in a direction that is substantially perpendicular to the local perimeter edge. The first and second dividing walls may extend in a direction that is parallel to the major axis of the panel.

The second region may be defined by the first and second dividing walls, the second curved portion, the first side edge, and the second side edge in arrangements including these features. The second region may itself be split into two, three, four or more sub-regions. Such sub-regions may be formed by further dividing walls within the second region, for example, third, fourth or fifth dividing walls. Such additional dividing walls may provide structural strength and/or rigidity to the structure.

When in use, the first curved portion may be positioned at a downstream end of the panel relative to a main flow into which the bleed flow though a bleed flow outlet panel exits. When in use, the second curved portion may be positioned at an upstream end of the panel relative to a main flow into which the bleed flow exits.

The total flow area of the exit passages in the second region may be greater than the total flow area of the exit passages in the first region.

The exit passages in the second region may be said to direct the bleed flow in a direction that, when projected onto the plane of the outlet panel, is locally perpendicular to the closest point on the perimeter edge of the outlet panel (that is, perpendicular to a tangent to the closest point on the perimeter edge). Where the perimeter edge of the second region comprises a straight portion, the exit passage(s) for which the straight portion is their closest point on the perimeter edge may point in a direction that is perpendicular to that straight portion. Where the perimeter edge of the second region comprises a segment of a circle, the exit passage(s) for which the segment of the circle is their closest point on the perimeter edge may point in a direction that is along a radius of that circular portion.

The exit passages in a bleed flow outlet panel may take any suitable form, for example any suitable size and/or shape. By way of example, the exit passages may be formed by vanes. Such vanes may be formed inside the perimeter edge of the outlet panel.

By way of further example, each region may comprise at least two offset walls that are offset from the perimeter edge, and each exit passage may be defined at least in part by adjacent offset walls or by the perimeter edge and the offset wall immediately adjacent the perimeter edge. The distance between an offset wall and an adjacent offset wall or perimeter edge may be constant around the entire length of the wall.

The exit passages of the first region may be arranged to direct the bleed flow within 10 degrees, for example within 5 degrees, of the major axis of the bleed flow outlet panel, for example within 4 degrees, 3 degrees, 2 degrees or 1 degree of the major axis.

The exit passages in the second region may be arranged to direct the bleed flow at an angle in the range of from 5 degrees to 40 degrees from the major axis of the bleed flow outlet, for example in the range of from 10 degrees to 35 degrees, for example in the range of from 15 degrees to 30 degrees, for example in the range of from 20 degrees to 25 degrees.

Each exit passage in the second region may be arranged to direct the bleed flow at substantially the same angle from the major axis as the other exit passages in the second region. The magnitude of the component of the bleed flow pointing towards the perimeter edge of the outlet panel may be the same for each exit passage in the second region in some arrangements.

The absolute direction of the bleed flow at exit from the exit passages may vary around the second region, for example depending on angular position around the major axis of the bleed flow outlet panel. Purely by way of example, the second region may extend around at least 180 degrees about the major axis, and the bleed flow through exit passages that are separated by 180 degrees may have components projected onto the plane of the outlet panel that are in opposite directions.

Accordingly, it will be appreciated that the optional bleed flow outlet panel may take a number of different forms.

According to an aspect, there is provided a turbofan gas turbine engine comprising a core engine through which core flow passes in use; a bypass duct surrounding the core engine and through which bypass flow passes in use; and a bleed flow assembly for allowing bleed flow to be selectively bled from the core flow to the bypass flow in use. The bleed flow assembly comprises a bleed valve in communication with the core flow and arranged to be selectively openable to allow bleed flow to be bled from the core flow. The bleed flow assembly also comprises at least one of a noise attenuation panel, a bleed flow discharge device, and a bleed flow outlet unit as described and/or claimed herein. The noise attenuation panel, bleed flow discharge device, and/or bleed flow outlet unit is arranged downstream of the bleed valve relative to the bleed flow, such that, in use, bleed flow that is selectively bled from the core flow through the bleed valve passes through the noise attenuation panel, bleed flow discharge device, and/or bleed flow outlet unit before being discharged into the bypass flow.

According to such arrangements, the bleed valve may be said to be in selective fluid communication with the core flow. The bleed flow discharge device may be said to be in fluid communication with the bleed valve. Together, the bleed flow discharge device and the bleed valve may be referred to as a bleed assembly.

The noise attenuation panel may be achiral. The noise attenuation panel may comprise at least one plane of symmetry. A mirror image of the noise attenuation panel may be geometrically identical to the noise attenuation panel itself.

Where a bleed flow outlet panel and a noise attenuation panel are integrally formed as a single unit, that single unit may be achiral and/or have at least one plane of symmetry. A mirror image of the single unit may be geometrically identical to the single unit itself.

According to an aspect, there is provided a method of manufacturing at least two identical achiral noise attenuation panels (which may be integrated into achiral bleed flow outlet units) using additive layer manufacture, wherein each noise attenuation panel comprises a first planar surface offset from a second planar surface along a longitudinal axis. Each new layer formed in the manufacture is offset from the previously manufactured layer in a manufacturing direction that corresponds to the longitudinal direction of the noise attenuation panel. All of the layers of one noise attenuation panel may be deposited before any of the layers of a subsequent noise attenuation panel are deposited. The first planar surface of one noise attenuation panel is manufactured adjacent the first planar surface of an adjacent noise attenuation panel and/or the second planar surface of one noise attenuation panel is manufactured adjacent the second planar surface of an adjacent noise attenuation panel.

Accordingly, the geometry of one noise attenuation panel is built as a mirror image of the geometry of adjacently manufactured noise attenuation panel. The mirror image is about the plane at which the two adjacent parts are joined (and ultimately separated from each other). Because the at least two parts are achiral, the mirrored parts are geometrically identical to each other. After manufacture, two adjacent parts may be said to be upside down relative to each other. As such, two parts that are separated from each other by another panel (i.e. adjacent but one panels) may be manufactured in the same orientation. After the manufacture, the at least two parts may be separated from each other, for example by electro discharge machining (EDM).

Manufacturing noise attenuation panels (or other components, such as bleed flow outlet units comprising a noise attenuation panel and a bleed flow outlet panel as described and/or claimed herein for example) in this manner may allow the manufacture of one component to be completed (at least in terms of the ALM process) before the manufacture of another component is started. All of the layers of one noise attenuation panel may be deposited before any of the layers of a subsequent noise attenuation panel are deposited. This may be advantageous if, for example, the process were to fail part way through, because at least those parts for which the ALM process has been completed could be further processed as required in order to become finished parts.

The noise attenuation panel may be in accordance with any noise attenuation panel described and/or claimed herein. The first planar face may comprise flow inlets and the second planar face may comprise corresponding flow outlets, or vice versa.

Any form of additive layer manufacture (ALM) may be used, such as direct laser deposition (DLD). Where ALM is used to manufacture the noise attenuation panel, the maximum angle between a surface and the longitudinal (or build) axis, which may be referred to as the "overhang", may be less than 45 degrees, for example less than 30 degrees. This may help to provide a desired surface finish and/or reliable manufacture.

The method described and claimed herein for manufacturing at least two identical achiral noise attenuation panels may be used to manufacture at least two identical achiral components of any form. Purely, by way of example, at least two achiral units comprising a noise attenuation panel and a bleed flow outlet panel may be manufactured using the ALM method described and claimed herein in relation to the manufacture of noise attenuation panels.

More generally, according to an aspect there is provided a method of manufacturing at least two identical achiral components using additive layer manufacture. Each component may comprises a first planar surface offset from a second planar surface along a longitudinal axis. Each new layer formed in the manufacture is offset from the previously manufactured layer in a manufacturing direction that corresponds to the longitudinal direction of the component. All of the layers of one component may be deposited before any of the layers of a subsequent component are deposited. The first planar surface of one component is manufactured adjacent the first planar surface of an adjacent component and/or the second planar surface of one component is manufactured adjacent the second planar surface of an adjacent component.

Any advantages of such a method of manufacture applied to a noise attenuation panel may also apply to the manufacture of other components.

BRIEF DESCRIPTION OF THE DRAWINGS

Embodiments of the invention will now be described by way of example only, with reference to the accompanying diagrammatic drawings, in which.

DETAILED DESCRIPTION OF EMBODIMENTS

Figure 2:
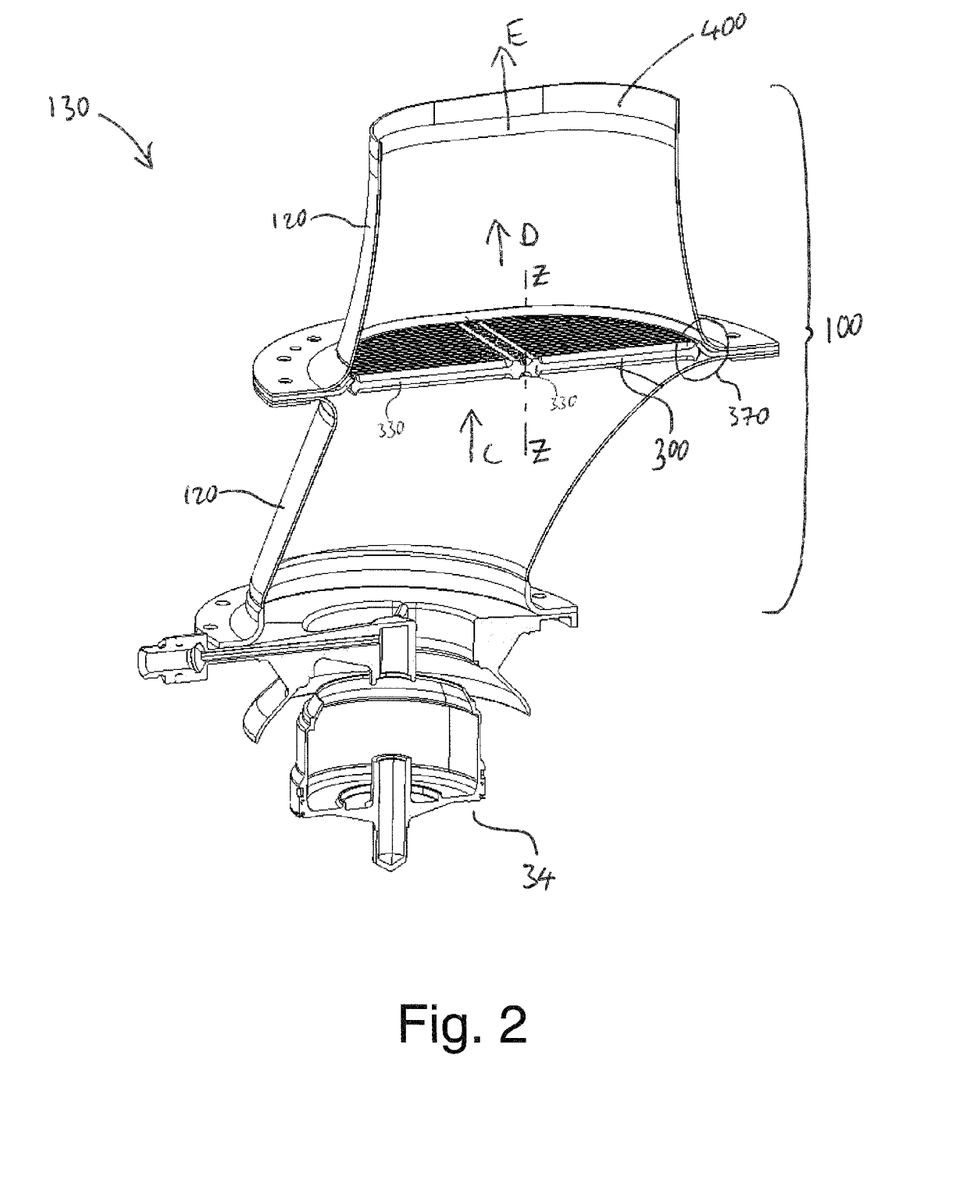
FIG. 2 is a schematic view of a bleed assembly comprising a noise attenuation device.

Referring to FIG. 2, a bleed assembly 130 comprises a noise attenuation panel 300 according to an example of the invention. The bleed assembly 130 comprises a bleed valve 34 which communicates at one end with the respective compressor 14, 15 (shown in FIG. 1) and is provided at its other end with a bleed flow discharge device 100. The noise attenuation panel 300 may be said to be part of the bleed flow discharge device 100. In operation of a gas turbine engine such as that shown by way of example in FIG. 1, part of the core engine air flow A may be diverted through the bleed assembly 130 by opening the bleed valve 34 so that the bleed air flow passes from the respective compressors 14, 15 to be discharged into the bypass duct 22 through the bleed flow discharge device 100.

A bleed assembly 130 and/or noise attenuation panel 300 such as that described herein in relation to FIGS. 2 to 8 may be used with any gas turbine engine, such as the gas turbine engine 10 shown in FIG. 1. Accordingly, the bleed flow assemblies shown by way of example in FIG. 1 are labelled 30/130, to indicate that the gas turbine engine 10 of FIG. 1 may comprise a bleed assembly 130 and/or bleed flow discharge device 100 and/or noise attenuation panel 300 in accordance with the invention, and thus may itself be in accordance with the invention.

The bleed flow discharge device 100 comprises a bleed flow duct 120 and the noise attenuation panel 300. In the example shown in FIG. 3, the outlet 400 of the bleed flow discharge device 100 is an open outlet. However, as described in more detail elsewhere herein, the outlet 400 could be provided with a bleed flow outlet panel, which may be formed as an integral part of the noise attenuation panel 300. The position of the noise attenuation panel 300 within the duct 120 shown in FIG. 2 is by way of example only. The noise attenuation panel 300 may be moved closer to (or even at) the outlet 400, or closer to the bleed valve 34.

Figure 3:
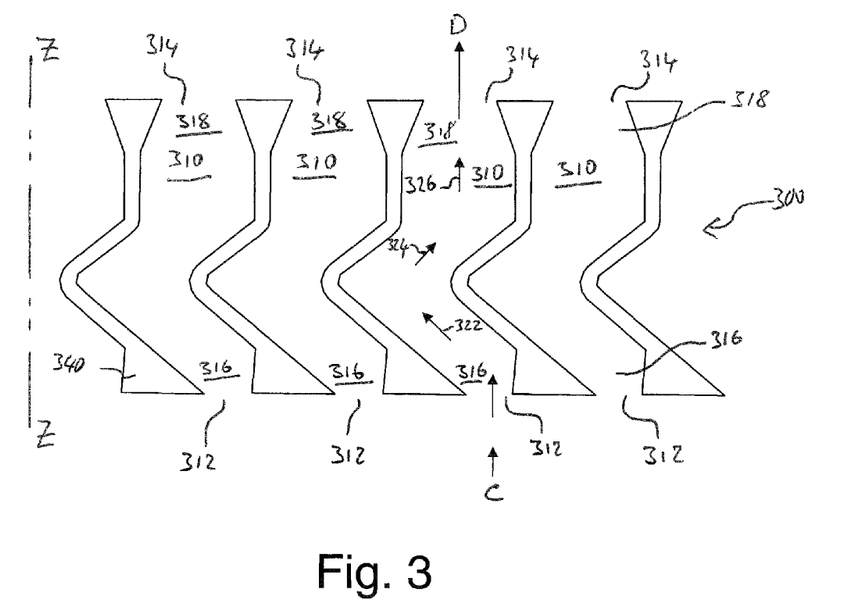
FIG. 3 is a schematic view of a noise attenuation device.

An example of a portion of a noise attenuation panel 300 is shown in more detail in FIG. 3. FIG. 3 only shows a portion of a noise attenuation panel 300, so as to show the geometry in greater detail. The noise attenuation panel 300 comprises a plurality of flow passages 310. Each flow passage 310 comprises a flow inlet 312 and a flow outlet 314. In use, bleed flow C, which may have been bled from a compressor 14, 15 through a bleed valve 34 as shown in FIG. 2, passes into the inlets 312.

The area of the bleed flow outlet 314 may be greater than the area of the bleed flow inlet 312, as in the FIG. 3 example. This may help to keep the static pressure at the flow outlet 314 similar to the static pressure at the flow inlet 312, for example. However, in other arrangements the area of the bleed flow outlet 314 may be the same as the area of the bleed flow inlet 312, or the area of the bleed flow outlet 314 may be less than the area of the bleed flow inlet 312.

The flow area of the bleed flow C is reduced by the noise attenuation panel 300 at entry, and so the flow accelerates as it enters the flow inlets 312. However, the flow remains subsonic through the inlets 312.

Downstream of the flow inlet 312, the area of each flow passage 310 increases, as shown by the region 316 in FIG. 3. Accordingly, the flow inlets 312 may be referred to as throats. The expansion region 316 may be rapid expansion, for example occurring over a distance of less than 5 mm, for example less than 2 mm, for example less than 1 mm, for example less than 0.5 mm, for example less than 0.2 mm. The flow in the flow passages 310 may become turbulent in the expansion region 316, for example due to flow separation just downstream of the inlet 312. The turbulent flow results in energy dissipation through the kinetic energy of the flow being converted into heat energy. This results in a loss of total pressure in the flow, which may be said to be due to the lack of dynamic head recovery because of the turbulent flow mixing caused by the rapid expansion 316 downstream of the flow inlet 312. Because the flow through the inlets 312 is subsonic, the rapid expansion and turbulent mixing may generate relatively little noise.

Upstream of each outlet 314 is a flow contraction portion 318. Thus, the flow area decreases into the outlet 314. The outlet may be referred to as a throat. Again, the flow remains subsonic through the outlets 314.

Figure 7:
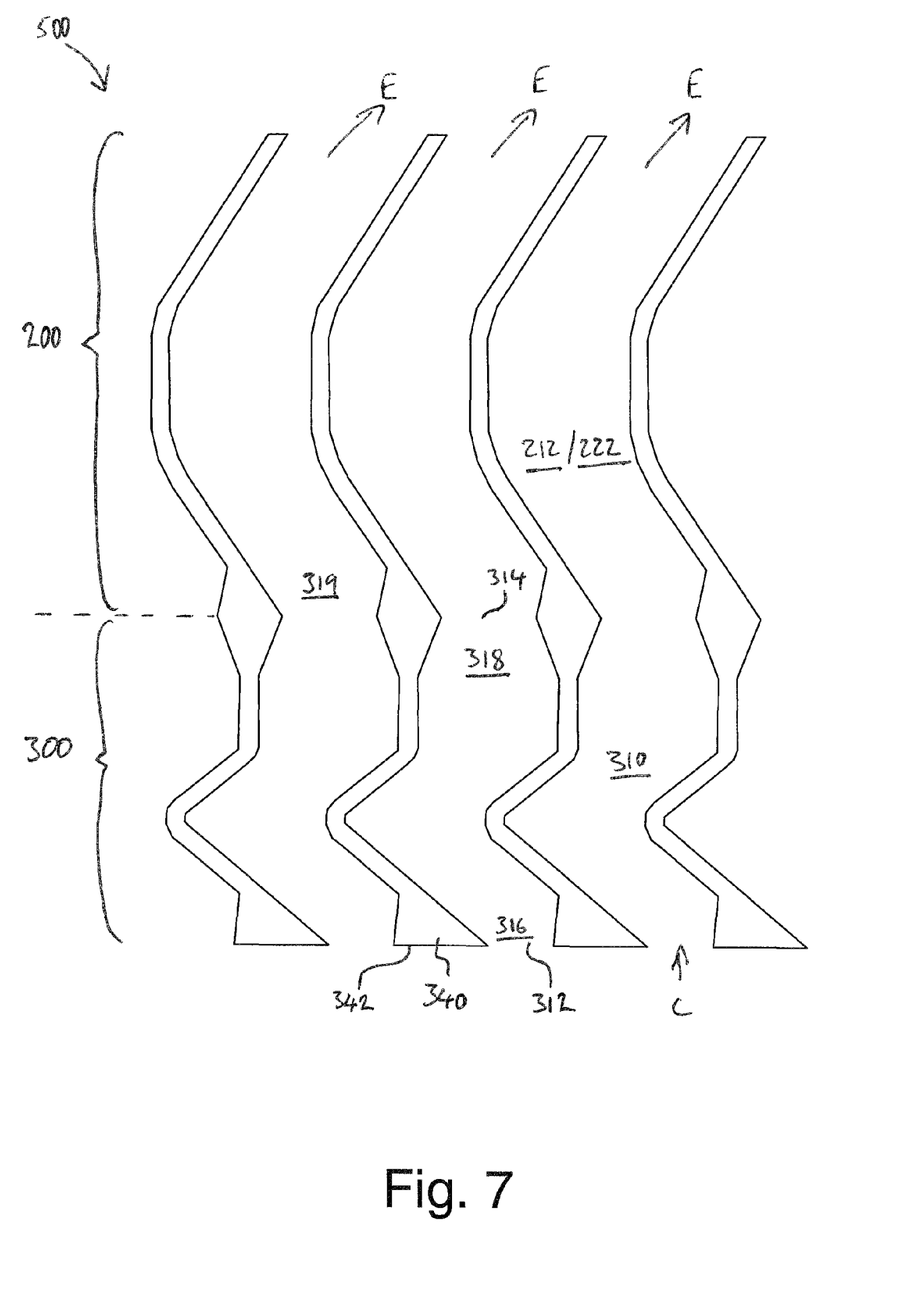
FIG. 7 is a schematic cross section through a unit having a noise attenuation device integrally formed with a bleed flow outlet panel.

After the bleed flow D exits though the outlets 314, it undergoes rapid expansion. As such, the bleed flow experiences further mixing and loss of total pressure due to lack of dynamic head recovery after it passes through the outlets 314. The bleed flow may pass out of the outlets 314 into an upper portion of the bleed flow duct 120, as shown by way of example in FIG. 1. Alternatively, as shown in FIG. 7 and described in more detail below, the bleed flow D may pass from the bleed flow outlets directly into a bleed flow outlet panel 200.

The first and second controlled total pressure reductions generated through the bleed flow mixing at exit from the inlet 312 (in expansion region 316) and exit from the outlet 314 (outside the noise attenuation panel 300) mean that the total pressure of the bleed flow E at the outlet 400 of the bleed flow discharge device 100 is lower than would otherwise be the case. This means that the flow E has less energy as it is ejected from the outlet 400, for example into the bypass flow B of a gas turbine engine. In turn this reduces the strength of a plume exiting the bleed flow discharge device 100, and the noise generated from such a plume.

In the arrangement shown in FIG. 3, the direction of the bleed flow changes as it passes through the noise attenuation panel 300. However, there may be no net direction change, such that the direction of the bleed flow C at inlet 312 may be the same as the direction of the bleed flow D at the outlet 314, as in the FIG. 3 example. There may be three distinct direction changes 322, 324, 326 through the flow passage 310, as in the FIG. 3 example. However, other arrangements, with different numbers (for example one, two, four, five or more than five) and/or angles of direction change are possible. The flow turning through the bleed flow passage 310 may assist in mixing the bleed flow in a short distance, for example in the direction of the longitudinal axis Z-Z of the noise attenuation panel 300. In this regard, the noise attenuation panel 300 may be regarded as a relatively thin panel that extends generally perpendicularly to the longitudinal axis Z-Z.

Figure 4:
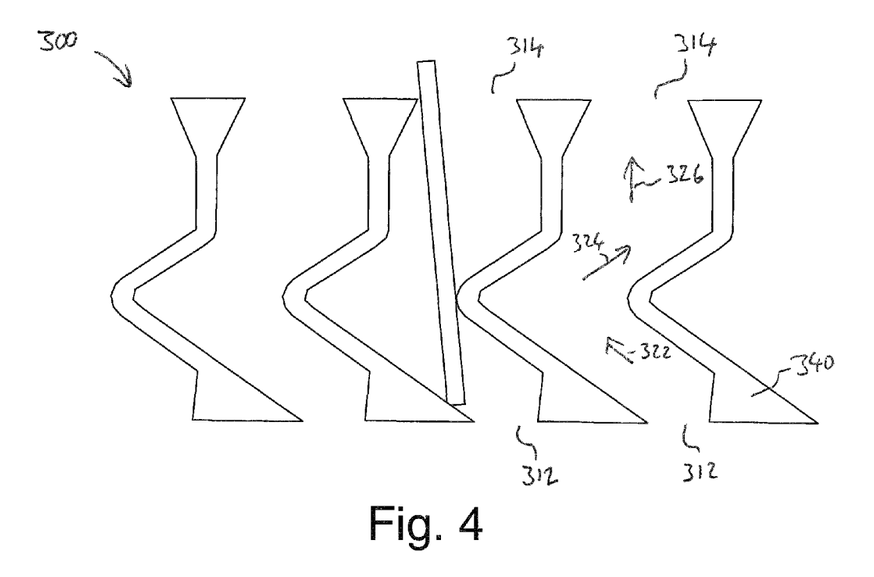
FIG. 4 is a schematic view of a noise attenuation device including a foreign object inserted into the flow passages.

As shown in FIG. 4, the direction changes 322, 324, 326 may be arranged so as to prevent a clear line of sight through a flow passage 310, from the inlet 312 to the outlet 314 or vice versa. This means that components, such as fixings, such as nuts, bolts and washers, cannot pass through the noise attenuation panel 300, for example during build and/or maintenance. This prevents the risk that such components could fall into the bleed valve 34, or even into the core of the engine 10 should the bleed valve be open. Of course, this may be achieved by ensuring that any line of sight through the flow passages were thinner than the thinnest component that could fall through them.

Figure 5:
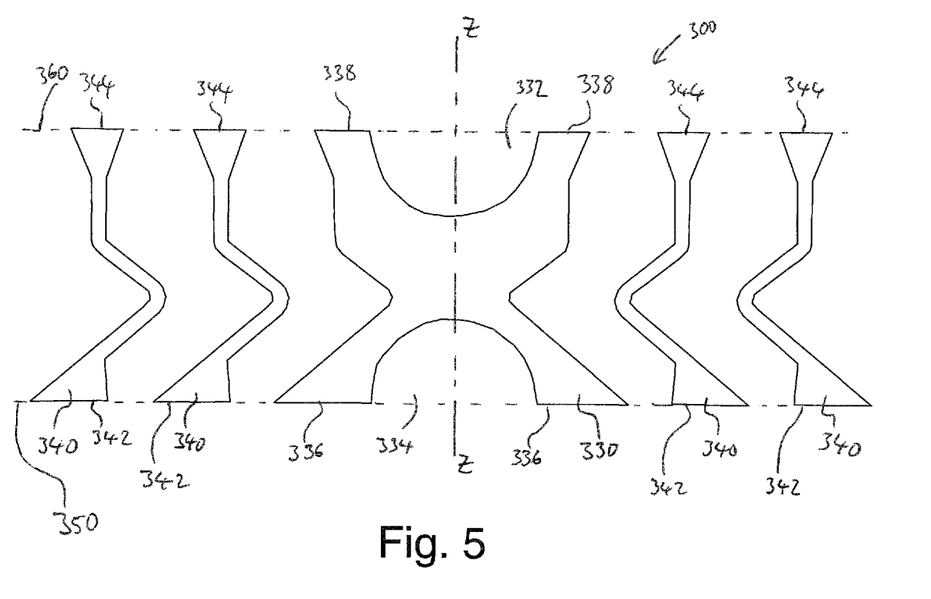
FIG. 5 is a schematic view of a bleed assembly comprising a noise attenuation device including a support rib.

FIG. 5 shows a cross section through a noise attenuation panel 300 in a plane that passes through a rib 330, which may be a stiffening rib 330. The rib 330 is also shown in FIG. 2. As shown most clearly in FIG. 2, such a rib 330 may extend along a centreline of the noise attenuation panel 300. The rib 330 may extend in a direction that is perpendicular to the longitudinal axis Z-Z of the noise attenuation panel 300. A noise attenuation panel 300 may comprise no ribs 330, one rib 330, or more than one rub 330, for example two ribs 330 as in the FIG. 2 example.

The rib 330 may help to reduce the maximum stress that occurs at the centre of the panel 300, for example at its inner and outer surfaces. This may allow the panel 300 to be thinner and/or lighter and/or less expensive. A rib 330 may take any suitable shape including, by way of example only, a simple oblong-shaped bar or an I-beam. In the example shown in FIG. 5, the rib 330 has portions 332, 334 on its upper and lower surface that are shaped so as to reduce the amount of material in the rib 330. This may be beneficial in reducing the potential damage caused by thermal shock, which may otherwise occur when the panel 300 is suddenly exposed to the relatively hot bleed flow gasses. The hot gasses could cause stress in the panel 300 due to parts of different thicknesses heating up and/or expanding at different rates. Such thermal shock damage may be reduced by minimizing the difference in thickness between the rib 330 and the passage elements 340 that form the flow passages 310, for example by removing material, as illustrated in regions 332, 334 in FIG. 5.

The noise attenuation panel 300 may be achiral. As such, a mirror image of the noise attenuation panel 300 may have the same geometry as the noise attenuation panel itself. In the FIG. 5 example, the panel 300 is achiral, and has at least one plane of symmetry, including for example one that contains both the longitudinal axis Z-Z and the centreline along which the stiffening rib 330 extends. In general a noise attenuation panel 300 may have one or more planes of symmetry.

Arranging the noise attenuation panel 300 such that it has the same geometry as its mirror may be advantageous during manufacture. For example, it may allow one panel 300 to be manufactured on top of, and upside down relative to, another panel 300. This may be useful if more than one panel 300 is to be manufactured using additive layer manufacture (ALM), such as direct laser deposition (DLD).

Thus, by way of example, an achiral noise attenuation panel 300 may be manufactured using ALM, with each layer being deposited in a plane that is perpendicular to the longitudinal axis Z-Z. As such, the panel 300 may be said to be manufactured in a horizontal orientation, that is with its main planes having the inlets 312 and the outlets 314 arranged horizontally during the manufacturing process.

The longitudinal extent of the noise attenuation panel 300 (which may be referred to as its thickness, in the direction of the longitudinal axis Z-Z) may be defined by surfaces that lie in planes 350, 360. Thus, the surfaces 342 of the passage elements 340 and the surfaces 336 of the rib 330 (where present) that define the flow inlets 312 may all lie in a plane 350. Similarly, the surfaces 344 of the passage elements 340 and the surfaces 338 of the rib 330 (where present) that define the flow inlets 314 may all lie in a plane 360. The two planes 350, 360 may be parallel, as in the examples of FIGS. 3 to 7.

Such planes 350, 360 defining the thickness of the panel 300 may allow one panel 300 to be built on top of another panel 300, with the two adjacent panels 300 flipped over (or upside down) relative to each other such that corresponding planes 350, 360 of adjacent panels 300 are coplanar during manufacture. This may be particularly beneficial during manufacture, because it means that all of the material for one panel 300 is deposited before any material for the next part is deposited. Accordingly, in the event of failure of the ALM machine (which may occur after hours or even days), only that panel that is currently being manufactured would become scrap, and all previously manufactured panels could be used. Of course, a noise attenuation panel 300 is an example of many components for which this is true.

Figure 6:
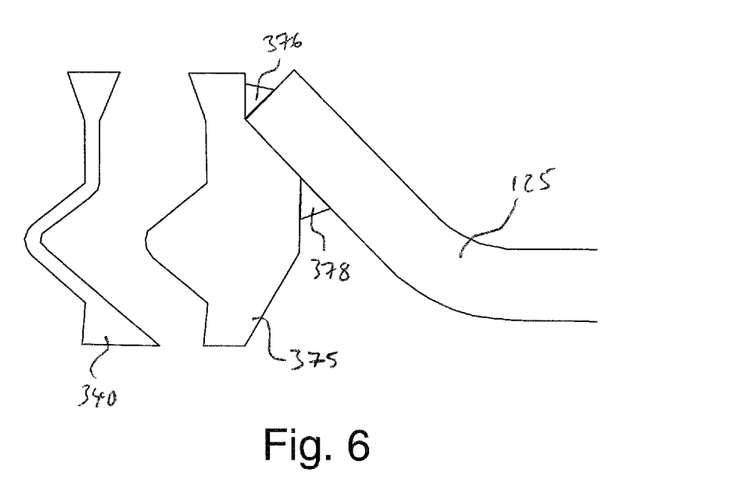
FIG. 6 is a schematic view showing the connection between a noise attenuation device and a bleed flow passage.

FIG. 6 is a cross sectional close-up of the region 370 at the edge of the noise attenuation panel 300 where it attaches to the bleed flow duct 120 of the bleed flow discharge device 100. The arrangement shown in FIG. 6 is merely a non-limitative example of a great many attachment arrangements that could be used.

In FIG. 6, the edge portion 375 of the panel 300 is simply welded 376, 378 to a connection plate 125 of the bleed flow duct 120. Accordingly, the relatively complex geometry of the noise attenuation panel 300 and the relatively straightforward geometry of the bleed flow duct 120 may be manufactured separately. Thus, for example, a relatively expensive ALM process could be used to manufacture the panel 300, but not the bleed flow duct 120.

FIG. 7 shows a bleed flow outlet unit 500 arranged to attenuate noise generated by a bleed flow and direct the bleed flow at the outlet of a bleed flow discharge device 100. The bleed flow outlet unit 500 comprises a noise attenuation portion 300 and a bleed flow outlet portion 200. The noise attenuation portion 300 and the bleed flow outlet portion 200 may be unitary and/or continuous, as in the FIG. 7 example.

The noise attenuation portion 300 may be substantially the same as the noise attenuation panel 300 described elsewhere herein, and thus like features are given the same reference numeral as in FIGS. 2 to 6 and will not be described further in relation to FIG. 7. However, in the bleed flow outlet unit 500 shown in FIG. 7, the rapid expansion of the bleed flow after it passes through the outlets 314 of the noise attenuation portion 300 occurs in expansion region 319 at the inlet to the bleed flow outlet portion 200. FIG. 7 shows an example in which each flow passage 310 of the noise attenuation portion 300 is directly fluidly connected to one (and only one, in the case of FIG. 7) bleed flow outlet passage 212/222 of the bleed flow outlet portion 200 (see also FIG. 8).

The bleed flow outlet portion 200 is arranged to ensure that the bleed flow E at exit from the bleed flow outlet unit 500 (and thus from a bleed flow assembly 130 in which it may be used) is in the desired direction and/or experiences appropriate mixing with the flow into which it is exhausted. The bleed flow outlet passages 212/222 may be arranged as desired to achieve such mixing and/or desired flow direction.

Figure 8:
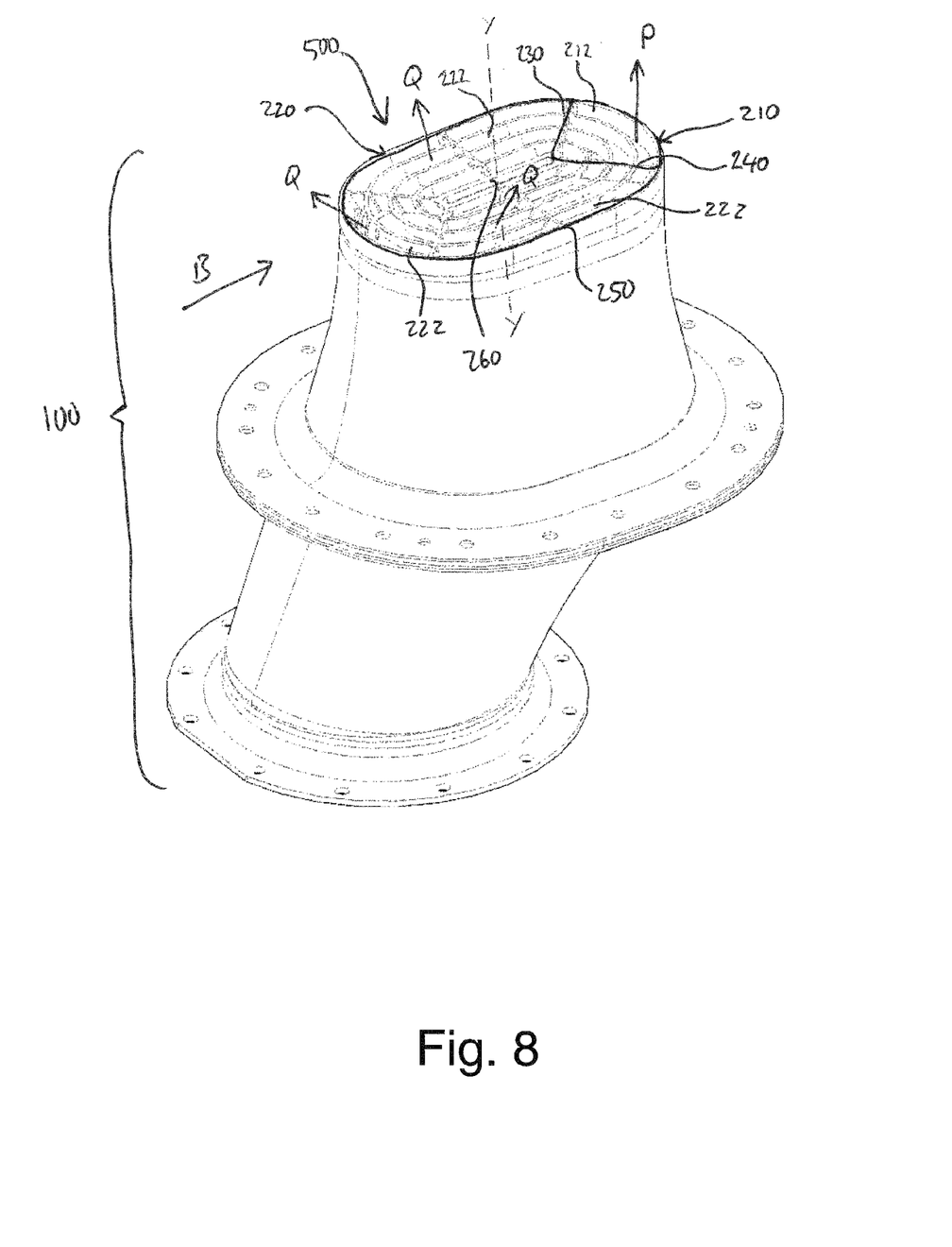
FIG. 8 is a schematic perspective view of a bleed flow outlet device.

An example of the a bleed flow outlet portion 200 is shown in schematic form in FIG. 8. The bleed flow outlet portion of FIG. 8 is a substantially planar structure having its major plane perpendicular to a major axis Y-Y. When in use, the major axis Y-Y may be substantially aligned with the radial axis of a gas turbine engine 10, and with the longitudinal axis Z-Z of the noise attenuation portion 300 (not shown in FIG. 8 as it is enclosed within the bleed flow duct 120).

The bleed flow outlet portion 200 of FIG. 8 comprises a first region 210 and a second region 220. The first region 210 and the second region 220 are separated from each other by a first wall 230 and a second wall 240. Each of the first wall 230 and the second wall 240 extends from a perimeter edge (which may be referred to as a perimeter edge wall) 250 to a centre (or centre region) 260 of the bleed flow outlet portion 200.

The first region 210 comprises exit passages 212 and the second region 220 comprises exit passages 222. In use, the bleed flow exits the bleed flow discharge device 100 through the exit passages 212, 222 in the bleed flow outlet portion 200 in such an arrangement.

The exit passages 212 point in a direction P that is substantially parallel to the major axis Y-Y of the bleed flow outlet panel 200. As such, the bleed flow is discharged through the exit passages 212 of the bleed flow outlet portion 200 in a direction that is substantially parallel to the major axis Y-Y.

The exit passages 222 in the second region point in a directions Q that have a component that points towards the perimeter edge 250 (that is, the closest point on the perimeter edge 250 to the respective exit passage 222), and a component that points in the direction of the major axis Y-Y. As such, the bleed flow is discharged through the exit passages 222 of the bleed flow outlet portion 200 in directions Q that have a component that points towards the perimeter edge 250, and a component that points in the direction of the major axis Y-Y. The bleed flows with direction P and Q together constitute the bleed flow E shown in FIG. 2 at exit to the bleed flow discharge device 100.

As illustrated in the FIG. 8 example, the absolute Q of the flow passing through the exit passages 222 in the second region 220 may be different for different exit passages 222 depending on, for example, the direction to the closest point on the perimeter edge 250. Similarly, the absolute direction of the flow passing through an individual exit passage 222 of the second region 220 may be different at different points within the exit passage 222, for example if the individual exit passage has a curved shape in planview (that is, a curved shape when viewed from a direction aligned with the major axis Y-Y).

As shown in FIG. 8, the first region 210 (for example the centroid of the first region 210) may be downstream of the second region 220 (for example the centroid of the second region 220) relative to the bypass flow B into which the bleed flow is discharged through the exit passages 212, 222. As such, the bleed flow exiting in the direction P substantially parallel to (or more parallel to) the major axis Y-Y may be at the downstream side or region of the bleed flow outlet portion 200 relative to the bypass flow. This may reduce the likelihood of the bleed flow (for example a plume resulting from the bleed flow) attaching to the inner surface 27 of the bypass duct 22, thereby reducing the likelihood of thermal damage to the inner surface.

In the example shown in FIG. 8, the perimeter edge 250 (and thus the planform shape) of the bleed flow outlet portion 200 is a stadium, or racetrack shape, i.e. it has two offset straight edges joined together by curves which, in the example of FIG. 8 are semicircles. However, the perimeter edge 250 could have any desired shape. Purely by way of non-limitative example, the perimeter edge 250 could be a rounded rectangle, circle, rectangle, ellipse, oval or any other suitable shape, such as any suitable elongate shape.

Although the bleed flow outlet portion 200 is described as being integral with the noise attenuation portion 300 in a bleed flow outlet unit 500, it will be appreciated that the bleed flow outlet portion 200 could be provided as a bleed flow outlet panel 200 that is separate to (and complimentary to) a noise attenuation panel 300 as described elsewhere herein.

Any method may be used to manufacture a bleed flow outlet unit 500. For example, a bleed flow outlet unit 500 may be manufactured using ALM/DLD, as described above in relation to the noise attenuation device 300 in isolation.

Although the noise attenuation panel 300 and bleed flow outlet unit 500 have been described herein in relation to discharging bleed flow into a bypass flow of a turbofan gas turbine engine, such a noise attenuation panel 300 and/or bleed flow outlet unit 500 may also be used where a bleed flow exhausts overboard from an engine into an external flow. For example, in the case of a turboprop or open rotor engine a bleed flow may exhaust to atmospheric conditions external to the engine with the discharge device disclosed herein. Similarly, the present disclosure may be applied to a land based gas turbine, e.g. an aero-derivative or other gas turbine, for which a bypass duct may not be present and the bleed flow may be exhausted to atmospheric conditions. In other words, the noise attenuation panel 500 and bleed flow discharge device 130 with which it is used may exhaust into any flow field, including but not limited to discharge into a bypass duct.

It will be appreciated that many designs and/or arrangements of features other than those shown in and described in relation to the Figures and not explicitly described herein fall within the scope of the invention. Furthermore, any feature described and/or claimed herein may be combined with any other compatible feature described in relation to the same or another embodiment.

I claim:

1. A noise attenuation panel for a gas turbine engine comprising:
    a plurality of flow passages, wherein:
    each flow passage comprises a flow inlet and a flow outlet and changes direction at least once between the flow inlet and the flow outlet;
    a flow area through the flow passage increases downstream of the flow inlet and decreases into the flow outlet;
    a flow area of the flow outlet is bigger than a flow area of the flow inlet;
    the flow inlets form a first planar surface and the flow outlets form a second planar surface offset from the first planar surface;
    the noise attenuation panel has a longitudinal axis that passes through a center of the noise attenuation panel and is perpendicular to the first planar surface or the second planar surface;
    the noise attenuation panel has a plane extending along the longitudinal axis and along a centerline of the noise attenuation panel; and
    the noise attenuation panel is achiral with respect to the longitudinal axis within the plane.

2. The noise attenuation panel according to claim 1, wherein the flow area through each flow passage increases by at least 25% downstream of the flow inlet within a distance of 2 mm from the flow inlet.

3. The noise attenuation panel according to claim 1, wherein each flow passage is in the same direction at the flow inlet and the flow outlet.

4. The noise attenuation panel according to claim 1, wherein each flow passage comprises three changes of direction between the flow inlet and the flow outlet.

5. The noise attenuation panel according to claim 1, wherein each flow outlet is offset from the flow inlet in a direction perpendicular to the longitudinal axis.

6. The noise attenuation panel according to claim 1, the noise attenuation panel comprising a stiffening rib that extends perpendicularly to the longitudinal axis and along the centerline of the noise attenuation panel, wherein the noise attenuation panel is symmetrical about the plane, wherein the plane passes through the centre of the stiffening rib.

7. A bleed flow discharge device for discharging a bleed flow taken from a core flow through a core of a gas turbine engine, the bleed flow discharge device comprising:
    a bleed flow duct through which, in use, the bleed flow taken from the core flow passes; and
    the noise attenuation panel according to claim 1, the noise attenuation panel being located within the bleed flow duct, such that the bleed flow passes through the noise attenuation panel before exiting from the bleed flow discharge device.

8. The bleed flow discharge device according to claim 7, the bleed flow discharge device having an inlet and an outlet, and further comprising a bleed flow outlet panel at the outlet through which, in use, the bleed flow exits the bleed flow discharge device.

9. The bleed flow discharge device according to claim 8, wherein the bleed flow outlet panel comprises:
   a perimeter edge that fits within the outlet of the bleed flow discharge device and is formed around a major axis of the bleed flow outlet panel; and
   a plurality of exit passages, the plurality of exit passages being formed in at least two distinct regions of the bleed flow outlet panel, each region comprising a plurality of adjacent exit passages, wherein
   the plurality of adjacent exit passages in a first region are arranged to direct the bleed flow, in use, in a direction that is substantially aligned with the major axis of the bleed flow outlet panel; and
   the plurality of adjacent exit passages in a second region are arranged to direct the bleed flow, in use, in a direction that, when projected onto a plane perpendicular to the major axis and containing the perimeter edge, points towards the closest point on the perimeter edge.

10. The bleed flow discharge device according to claim 9, arranged for use with a turbofan gas turbine engine having a bypass duct arranged around the core of the turbofan gas turbine engine, the bypass duct having a bypass flow passing therethrough in use, wherein the plurality of exit passages are arranged to discharge the bleed flow into the bypass duct and the second region of the bleed flow outlet panel is generally downstream of the first region relative to the direction of the bypass flow in use.

11. The bleed flow discharge device according to claim 8, wherein the bleed flow outlet panel and the noise attenuation panel are a single unit, with the flow outlets of the plurality of flow passages of the noise attenuation panel forming inlets to the plurality of exit passages of the bleed flow outlet panel.

12. A bleed flow outlet unit arranged to attenuate noise and direct bleed flow taken from a core flow through a core of a gas turbine engine, the bleed flow outlet unit being a unitary part comprising:
   a noise attenuation portion comprising the noise attenuation panel according to claim 1; and
   a bleed flow outlet portion, wherein
   the bleed flow outlet portion comprises bleed flow outlet passages; and
   each flow passage of the plurality of flow passages of the noise attenuation portion is fluidly connected to a single respective bleed flow outlet passage such that each flow passage of the plurality of flow passages of the noise attenuation portion forms a continuous flow passage with its single respective bleed flow outlet passage.

13. A turbofan gas turbine engine comprising:
   a core engine through which a core flow passes in use;
   a bypass duct surrounding the core engine and through which a bypass flow passes in use; and
   a bleed flow assembly for allowing a bleed flow to be selectively bled from the core flow to the bypass flow in use, the bleed flow assembly comprising:
   a bleed valve in communication with the core flow and arranged to be selectively openable to allow bleed flow to be bled from the core flow; and
   the noise attenuation panel according to claim 1, wherein:
   the noise attenuation panel is arranged downstream of the bleed valve relative to the bleed flow, such that, in use, bleed flow that selectively bled from the core flow through the bleed valve passes through the noise attenuation panel before being discharged into the bypass flow.

\* \* \* \* \*